US008378019B2

(12) United States Patent
Juul

(10) Patent No.: US 8,378,019 B2
(45) Date of Patent: Feb. 19, 2013

(54) ADHESIVE COMPOSITION COMPRISING A POLYOL BASE PART AND AN ISOCYANATE HARDENER AND THE USE THEREOF

(75) Inventor: Allan Juul, Allerod (DK)

(73) Assignee: Sika Technology AG, Baar (CH)

( * ) Notice: Subject to any disclaimer, the term of this patent is extended or adjusted under 35 U.S.C. 154(b) by 668 days.

(21) Appl. No.: 12/086,750

(22) PCT Filed: Dec. 22, 2006

(86) PCT No.: PCT/EP2006/070150
§ 371 (c)(1),
(2), (4) Date: Oct. 22, 2009

(87) PCT Pub. No.: WO2007/071781
PCT Pub. Date: Jun. 28, 2007

(65) Prior Publication Data
US 2010/0143723 A1    Jun. 10, 2010

(30) Foreign Application Priority Data
Dec. 23, 2005   (EP) .................................... 05112869

(51) Int. Cl.
| B32B 27/00 | (2006.01) |
| B32B 27/40 | (2006.01) |
| B60P 3/22 | (2006.01) |
| B62D 1/16 | (2006.01) |
| C08G 18/00 | (2006.01) |
| C08G 18/08 | (2006.01) |
| C08G 18/16 | (2006.01) |
| C08G 18/28 | (2006.01) |
| C08J 3/00 | (2006.01) |
| C08K 3/34 | (2006.01) |
| C08L 75/00 | (2006.01) |

(52) U.S. Cl. ............ 524/590; 280/3; 280/838; 280/839; 428/423.1; 524/450; 524/589; 528/44; 528/48; 528/52; 528/85

(58) Field of Classification Search .................. 524/450, 524/589, 590; 528/44, 48, 85, 52; 428/423.1; 280/3, 838, 839
See application file for complete search history.

(56) References Cited

U.S. PATENT DOCUMENTS
| 4,515,933 A | 5/1985 | Chang |
| 4,868,266 A | 9/1989 | Meckel et al. |
| 6,572,729 B1 | 6/2003 | Auvray et al. |

FOREIGN PATENT DOCUMENTS
| EP | 0 982 333 A1 | 3/2000 |
| EP | 1 072 622 A1 | 1/2001 |
| GB | 2 085 902 A | 5/1982 |
| WO | WO 02/062864 A2 | 8/2002 |

*Primary Examiner* — Patrick Niland
(74) *Attorney, Agent, or Firm* — Oliff & Berridge, PLC

(57) ABSTRACT

An Adhesive Composition Comprising a Polyol Base Part and an Isocyanate Hardener and the Use thereof An adhesive composition comprising a two-component polyurethane binder composition comprising a polyol base part comprising a catalyst and a low viscosity solvent-free MDI hardener may be used for assembling an object from a number of parts to be assembled by a glue joint and even by heating only the free end of the glue joint to a temperature activating the catalyst a quick hardening will occur allowing an early moving of an assembly being assembled using the adhesive composition and thus allowing the use of the same site for assembling another assembly within the same working day.

9 Claims, 2 Drawing Sheets

ADHESIVE COMPOSITION COMPRISING A POLYOL BASE PART AND AN ISOCYANATE HARDENER AND THE USE THEREOF

BACKGROUND OF THE INVENTION

1. Field of the Invention

The present invention relates to an adhesive composition, a polyol composition for use as polyol base part in a polyurethane adhesive, the use of such an adhesive in the assembly an object from a number of parts to be assembled by glue joints.

2. Description of the Related Art

When producing bodies for trucks and trailers or semi-trailers it is common to combine various parts such as floor, sides, roof and end panels using glue joints. Such glue joints are often of a thickness up to from 3 to 6 millimeters and a length typically from 50 to 100 millimeters or more. The normal time for assembling a body for trucks and trailers or semi-trailers takes very long, which restricts the rate of production and demands very large production facilities in order to provide for a reasonably high production.

Thus, there is a need for a glue composition which cures sufficiently fast for enabling an early moving of a body made from several parts assembled by glue joints and still conserves a long open time for allowing the application of adhesive composition and assembly of the parts to be assembled without problems associated with early curing of the composition. Furthermore there is a need for an adhesive composition the curing of which may be accelerated using heat without having to apply heat to essentially all of the surfaces to be joined.

SUMMARY OF THE INVENTION

The present invention relates to an adhesive composition comprising a two-component polyurethane binder composition comprising a polyol base part comprising a catalyst and a low viscosity solvent-free MDI hardener.

In a second aspect the invention relates to a polyol composition suitable for use as polyol base part in the manufacture of polyurethane adhesive compositions comprising a two-component polyurethane binder composition comprising a polyol base part comprising a catalyst and a low viscosity solvent-free MDI hardener.

In a third aspect the invention relates to a method for assembling an object from a number of parts to be assembled by a glue joint comprising the steps of providing a number of parts to be assembled using glue joints, applying an adhesive composition comprising a two-component polyurethane binder composition comprising a polyol base part comprising a catalyst and a low viscosity solvent-free MDI hardener at the surfaces to be joined, assembling the object and heating the free exposed end of the glue joint to a temperature activating the catalyst.

In a fourth aspect the invention relates to an object used in automotive, wherein the object comprises parts which are assembled by an adhesive composition as defined above.

BRIEF DESCRIPTION OF THE DRAWINGS

The invention is disclosed more in detail with reference to the drawings in which FIG. 1 schematically and partially exploded shows the joints between the roof and the side and the side and the floor of a body for a truck, trailer or semi-trailer made in accordance with the invention, FIG. 2 schematically shows the making of a top corner of an assembly in accordance with the invention and shows a heat band, and FIG. 3 schematically shows an assembly in accordance with the invention showing two heat bands.

DETAILED DESCRIPTION OF THE PRESENT INVENTION

Figure 1:
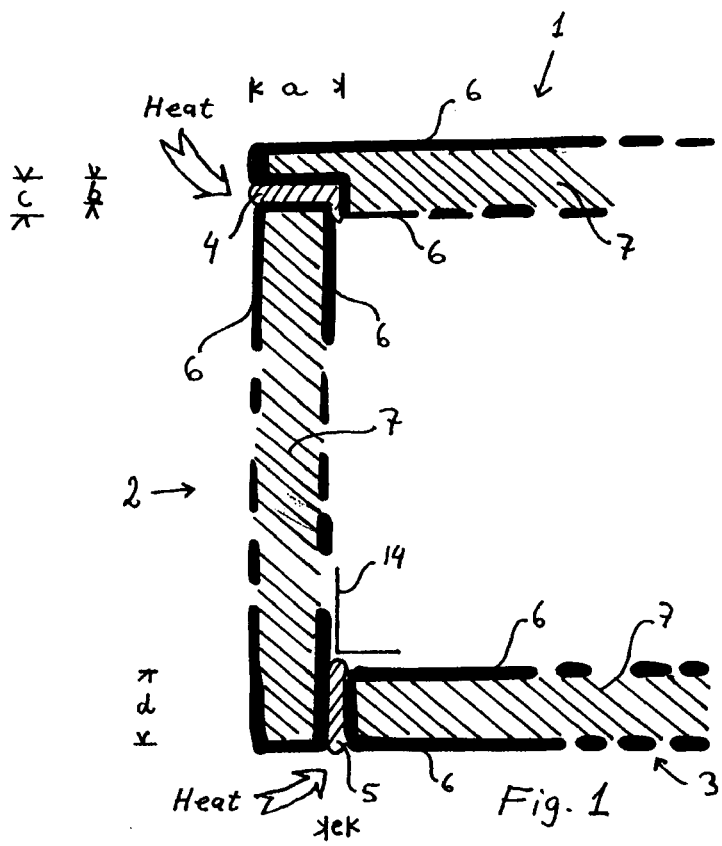

The present invention relates to an adhesive composition comprising a two-component polyurethane binder composition comprising a polyol base part comprising a catalyst and a low viscosity solvent-free MDI hardener.

The adhesive composition of the invention-will cure sufficiently within 90 minutes after activating the catalyst to allow moving of an assembly being assembled using the adhesive composition and thus allows the use of the same site for assembling another assembly within the same working day.

It is preferred that the catalyst is a heat activated delayed-action catalyst.

Thus, it has been found that a rapid curing of the adhesive composition of the invention may be effected simply by heating a free exposed end of the glue joint activating the catalyst whereafter the curing proceeds rapidly through the adhesive composition of the invention providing a sufficient strength for moving the assembled parts within a short time.

The binder should have a sufficiently high viscosity for use as an adhesive for assembling units such as walls, floors or side panels for e.g. a body for a truck, trailer or semi-trailer. Thus, the adhesive should be in the form of a paste preferably having a viscosity of about 1,000,000 mPas (Brookfield RTV 7/2.5 at 23° C. and 50% RH).

An adhesive composition of the invention may also comprise further components commonly used in adhesive compositions such as additives or fillers. Typically the polyol base part comprises from about 25 to about 50 parts by weight of one or more polyols, from about 50 to about 75 parts by weight of one or more mineral fillers and/or pigments, from about 2 to about 10 parts by weight of a water removing component, above about 0.1 parts by weight of a heat activated delayed-action catalyst, and from about 0.3 to about 1.2 parts by weight of one or more agents for wetting and stabilization of inorganic and organic pigments and improving adherence to glass fibres.

In a preferred embodiment of the invention the polyol base part comprises from about 30 to about 40 parts by weight of one or more polyols, and/or from about 55 to about 65 parts by weight of one or more mineral fillers and/or pigments, and/or from about 3 to about 7 parts by weight of a water removing component, and/or from about 0.2 to about 0.5 parts by weight of a heat activated delayed-action catalyst, and/or from about 0.8 to about 1.0 parts by weight of one or more agents for wetting and stabilization of inorganic and organic pigments and improving adherence to glass fibres.

In a most preferred embodiment of the invention the polyol base part comprises about 33.3 parts by weight of polyol component, about 51.1 parts by weight of calcium carbonate powders, about 9.8 parts by weight of a pigment, about 4.9% water removing component, about 0.2 parts by weight of a heat activated delayed-action catalyst, and about 0.9 parts by weight of a combination one or more of wetting and stabilization agents and solvent the improving adherence to glass fibres.

Such a polyol base part has been found to have a shelf life in original closed packaging of at least 3 months.

A two component adhesive composition according to the invention was made from a polyol component (Component A) having the above-mentioned preferred composition and as component B was used a hardener SikaForce-7010.

An adhesive composition was made by mixing 100 parts by weight of Component A with 19 parts by weight of Component B.

The polyol component was a paste and the resulting mixture was also a paste. The mixture had an open-time of 105 minutes at 20° C., 75 minutes at 25° C. and 60 minutes at 30° C. and a hardness of 80-85 Shore D after curing at 60° C.

The polyol component may suitably comprise a natural polyol oil such as castor oil, a low viscous glycerine propoxylated polyether triol such as Voranol CP 450 from Dow Plastics having a viscosity of 300-360 cSt at 25° C. according to ATSM D445-94, a higher functional polyether polyol based on sorbitol such as Lupranol® 3422 from BASF or a tetra functional viscous liquid polyol such as tetra-(2-hydroxy propyl)-ethylenediamine such as Quadrol® Polyol having a viscosity of 900 cps at 60° C. from BASF, preferably a mixture of castor oil and a higher functional polyether polyol based on sorbitol.

The mineral fillers may suitably be calcium carbonate powders such as marble powder such as OMYACARB™ 10-GU from Omya AB having a mean particle size of 7 μm, calcium carbonate powder such as OMYALITE® 90 from Omya AB having a mean particle size of 1 μm or precipitated calcium carbonate such as Calofort S from Specialty Minerals, Liffort, UK. The filler may suitably be a mixture of filers of a different particle size for adjusting the viscosity of the polyol component.

Pigments may suitably be pigments imparting a grey or preferably white colour to an adhesive composition of the invention. Such pigments may e.g. be titanium dioxide such as Kemira X 660 and/or carbon black such as a pigment paste such as Helio Beit UL 904 comprising Furnace Black RCC.

The water removing component may be a molecular sieve such as a water absorbing mineral powder such as a zeolite, suitably an a zeolite such as UOP L powder from UOP LLC or Sylosiv A 3 from GRACE Davison in order to avoid adverse effects of water such as formation of foam during the hardening of the adhesive composition.

A heat activated delayed-action catalyst may suitably be present in an amount of from about 0.1 to about 1.0 parts by weight, preferably from about 0.2 to 0.5 parts by weight, giving rise to a relatively long open time of about 1 hour allowing reasonable time for applying the adhesive composition and providing for a very short curing time allowing the moving of an assembly being assembled using the adhesive composition in less than 90 minutes after activating the catalyst. When adding a larger amount of catalyst a very short curing time to the detriment of the open time which may be too short for practical purposes is obtained. A suitable catalyst is a based on the cyclic amine 1,5-diazabicyclo[5.4.0]undec-5-ene such as POLYCAT® SA-1 from Air Products having a suitable activation temperature.

It is preferred that the catalyst is a heat activated delayed-action catalyst which accelerates the curing at temperatures above about 50-55° C., e.g. above 60° C. enabling a long open-time at temperatures normally occurring when handling the adhesive compositions and providing a very short press time of the order of 5 minutes at about 70° C. reducing the needed curing time of the composition.

The agents for wetting and stabilization of inorganic and organic pigments and improving adherence to glass fibres may suitably be mixture of a solvent such as an alkyl benzene having up to 18 carbon atoms in the alkyl moiety, suitably dodecyl benzene or acetyl acetone and a dispersing additive for solvent based systems such as Colorol F produced by Tego and obtainable from Gold-schmidt. Such a mixture suitably contains the solvent and the wetting and dispersing additive in a proportion of from 1:3 to 1:5.

Agents and improving adherence to glass fibres may be solvents such as acetylacetone, N-methyl-2-pyrrolidone or a blend of dimethyl glutarathe, dimethyl succinate and dimethyl adipate sold under the trademark Rhodiasolv RPDE, alternative solvents such as the solvents marketed under the trade names Rhodiasolv DIB by Rhodia or Uniquema Prifer 6813. Preferably acetylacetone is used.

The hardener for use in a composition of the invention may suitably be a diisocyanate such as diphenyl-4,4'-diisocyanate (MDI) or a mixture comprising isomers and homologues having higher function. Suitable hardeners are e.g. Desmodur® VK10, VKS 20, VKS 20 F , VKS 20 L or VKS 44, Lupranat® M 20 S from BASF, Suprasec 5025 from Huntsman and SikaForce®-7010.

In a second aspect the invention relates to a polyol composition suitable for use as polyol base part in the manufacture of polyurethane adhesive compositions comprising a two-component polyurethane binder composition comprising a polyol base part comprising a catalyst and a low viscosity solvent-free MDI hardener.

It is preferred that the catalyst is a heat activated delayed-action catalyst.

A polyol composition according to the invention may also comprise further components commonly used in adhesive compositions such as additives or fillers as stated above in connection with adhesive compositions according to the invention.

In a third aspect the invention relates to a method for assembling an object from a number of parts to be assembled by a glue joint comprising the steps of providing a number of parts to be assembled using glue joints, applying an adhesive composition comprising a two-component polyurethane binder composition comprising a polyol base part comprising a catalyst and a low viscosity solvent-free MDI hardener at the surfaces to be joined, assembling the object and heating the free end of the glue joint to a temperature activating the catalyst.

It has been found that even though only the free end of the glue joint is subjected to an increased temperature for activating the catalyst, a rapid curing of the glue joint will proceed through the glue joint allowing moving of an assembly being assembled using the adhesive composition and thus allows the use of the same site for assembling another assembly within the same working day.

In a preferred embodiment the catalyst is a heat-activated delayed-action urethane catalyst giving the advantages stated above.

The catalyst is preferably activated for accelerating the curing at temperatures above 60° C. in order to give a suitable open-time when working at ambient temperatures up to maybe 30° C. or even more in warmer climates.

DESCRIPTION OF THE PREFERRED EMBODIMENTS

The invention is now explained more in detail with reference to the drawings showing preferred embodiments of the invention.

Reference is made to FIG. 1 which schematically and in a partially exploded view shows the joints between the roof and the left side panel and the left side panel and the floor of a body for a truck, trailer or semi-trailer made in accordance with the invention. The roof 1, side walls 2 and floor 3 were made from panels having a core 7 of expanded polyurethane foam and laminated surfaces 6 of reinforced glass fibre laminate. Between the roof 1 and wall 2 was a glue joint 4 and between the wall 2 and the floor 3 was another glue joint 5. It is schematically shown by arrows where the joints were heated during practising the method of the invention. The glue joint in the upper corner has a horizontal length a of 65 millimeters, a thickness b of 2 millimeters and a vertical length c of 8 millimeters. In the lower corner is shown an impact protection strip 14 for protecting the side panels from damage from fork-lift trucks or pallets.

Figure 2:
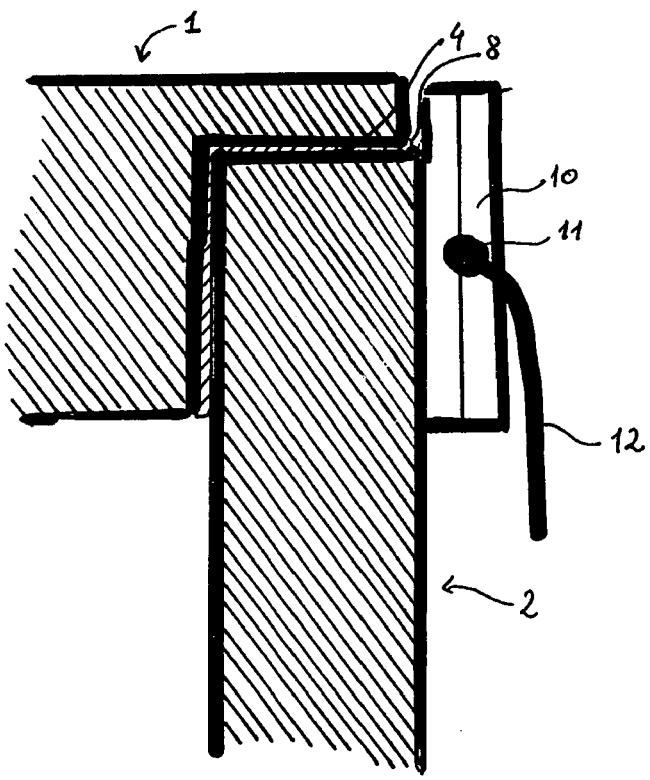

FIG. 2 shows schematically a detail of a right top corner of the assembly of FIG. 1 together with a heating band. The roof 1 and a right side wall 2 are connected by a glue joint 4 and a heating band having a metal body 10 and a heating device 11 and a wire 12 for supplying electrical power is placed at the outer end of the glue joint. When turning on the heating band 10, the open end 8 of the glue joint 4 is heated to activate the catalyst and accelerating the curing. It has been found that activation form the outer end of a glue joint is sufficient to make the curing proceed rapidly through the adhesive material and joining the wall and roof.

Figure 3:
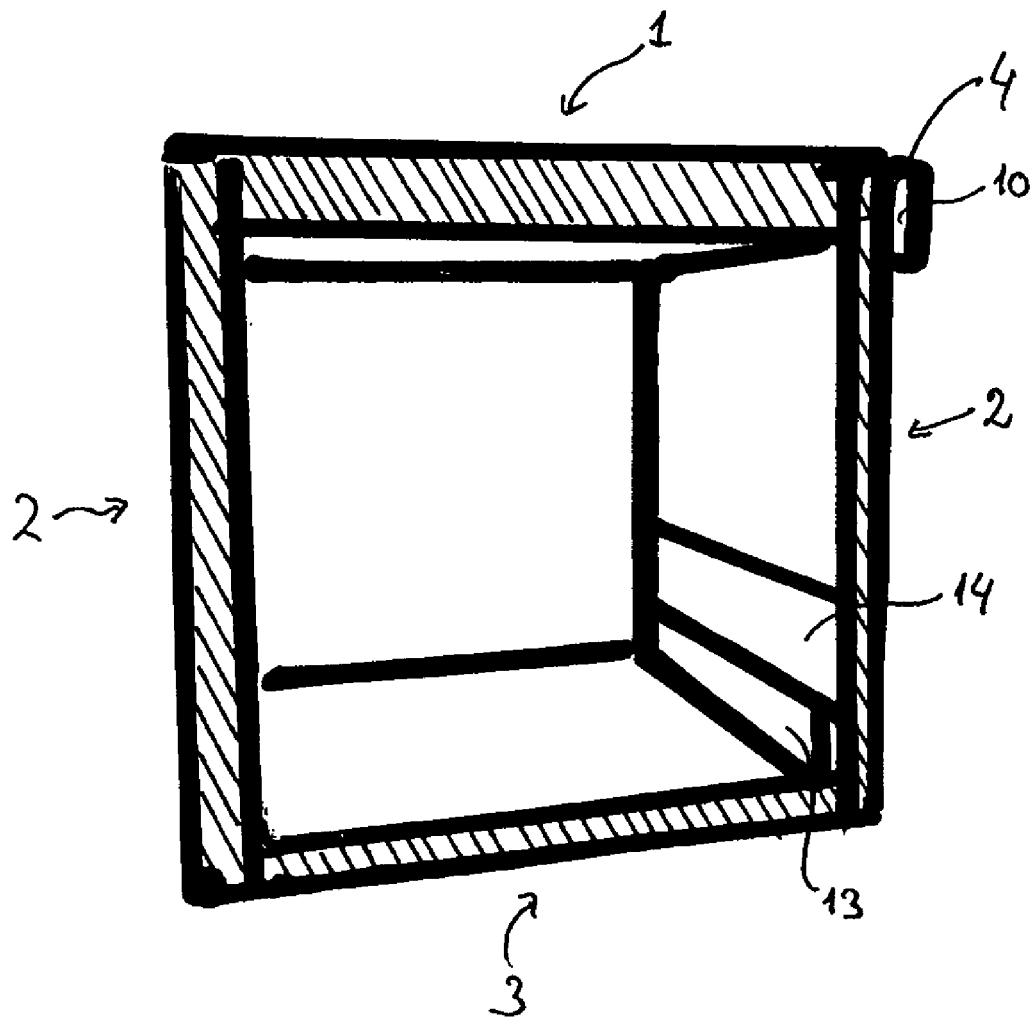

FIG. 3 shows schematically an assembly as shown in FIGS. 1 and 2 in accordance with the invention in which a roof 1 and side panels 2 and a floor 3 of a body for a truck, trailer or semi-trailer is joined using glue joints the curing of which is initiated by heating bands 10 and 13 for heating the open ends of the glue joints 4 and 5 to activate the catalyst and accelerating the curing. The heating bands are only shown at the right side of the assembly. At the lower-most part of the side panels are provided impact protection strips 14 for avoiding damage from fork-lift trucks or pallets. The impact protection strip is only shown at the right side of the assembly.

An assembly as shown in the above drawings was made using a roof panel and wall panels and a floor panel of the kind disclosed above and the preferred adhesive composition of the invention. After applying the adhesive composition to the areas to be joined and compressing the panels using clamps the catalyst was activated by heating the outer edge thereof to a temperature of 60° C. using a heating band where after a rapid curing occurred and the assembly could be moved after 90 minutes.

The invention claimed is:

1. An adhesive composition comprising a two-component polyurethane binder composition that comprises:
   a polyol base part, and
   a solvent-free MDI hardener,
   wherein the polyol base part comprises from about 25 to about 50 parts by weight of one or more polyols, from about 50 to about 75 parts by weight of one or more mineral fillers and/or pigments, from about 2 to about 10 parts by weight of a water removing component, above about 0.1 parts by weight of a heat activated delayed-action catalyst, and from about 0.3 to about 1.2 parts by weight of one or more agents for wetting and stabilization of inorganic and organic pigments and improving adherence to glass fibres.

2. An adhesive composition as claimed in claim 1, wherein the polyol base part comprises from about 30 to about 40 parts by weight of one or more polyols, and/or from about 55 to about 65 parts by weight of one or more mineral fillers and/or pigments, and/or from about 3 to about 7 parts by weight of a water removing component, and/or from about 0.2 to about 0.5 parts by weight of a heat activated delayed-action catalyst, and/or from about 0.8 to about 1.0 parts by weight of one or more agents for wetting and stabilization of inorganic and organic pigments and improving adherence to glass fibres.

3. A polyol composition suitable for use as a polyol base part in the manufacture of an adhesive composition comprising a two-component polyurethane binder composition that comprises:
   the polyol base part, and
   a solvent-free MDI hardener,
   wherein the polyol composition comprises from about 25 to about 50 parts by weight of one or more polyols, from about 50 to about 75 parts by weight of one or more mineral fillers and/or pigments, from about 2 to about 10 parts by weight of a water removing component, above about 0.1 parts by weight of a heat activated delayed-action catalyst, and from about 0.3 to about 1.2 parts by weight of one or more agents for wetting and stabilization of inorganic and organic pigments and improving adherence to glass fibres.

4. A polyol composition as claimed in claim 3 wherein the polyol composition comprises from about 30 to about 40 parts by weight of one or more polyols, and/or from about 55 to about 65 parts by weight of one or more mineral fillers and/or pigments, and/or from about 3 to about 7 parts by weight of a water removing component, and/or from about 0.2 to about 0.5 parts by weight of a heat activated delayed-action catalyst, and/or from about 0.8 to about 1.0 parts by weight of one or more agents for wetting and stabilization of inorganic and organic pigments and improving adherence to glass fibres.

5. A method for assembling an object from a number of parts to be assembled by a glue joint comprising the steps of:
   providing a number of parts to be assembled using glue joints,
   applying an adhesive composition as claimed in claim 1 at the surfaces to be joined, and
   assembling the object and heating the free end of the glue joint to a temperature activating the catalyst.

6. A method as claimed in claim 5, wherein the catalyst accelerates the curing at temperatures above 50-55° C.

7. A method as claimed in claim 5, wherein the curing is initiated by heating bands.

8. An automotive object, wherein the object comprises parts which are joined by an adhesive composition as claimed in claim 1.

9. Object as claimed in claim 8, wherein the object is a truck, trailer or semi-trailer.

* * * * *